June 23, 1964   H. D. MURRAY, JR., ETAL   3,138,779
GLIDE SLOPE INDICATOR
Filed July 25, 1962   2 Sheets-Sheet 1

HENRY DOYLE MURRAY, JR.
EVERETT E. JOHNSTON
INVENTORS

BY *Herbert J. Brown*

ATTORNEY

June 23, 1964
H. D. MURRAY, JR., ETAL
3,138,779
GLIDE SLOPE INDICATOR
Filed July 25, 1962
2 Sheets-Sheet 2
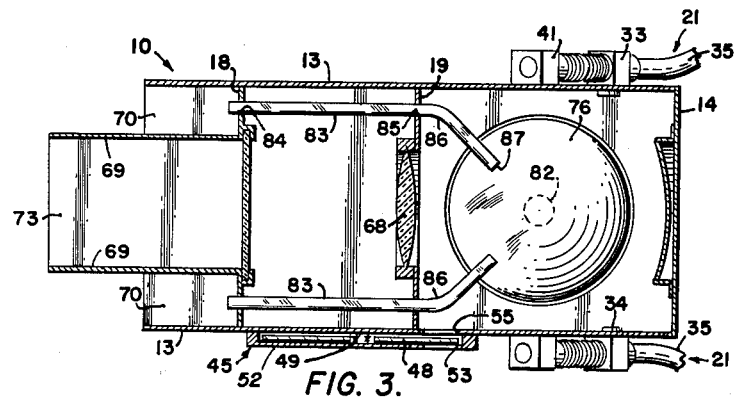
FIG. 3.
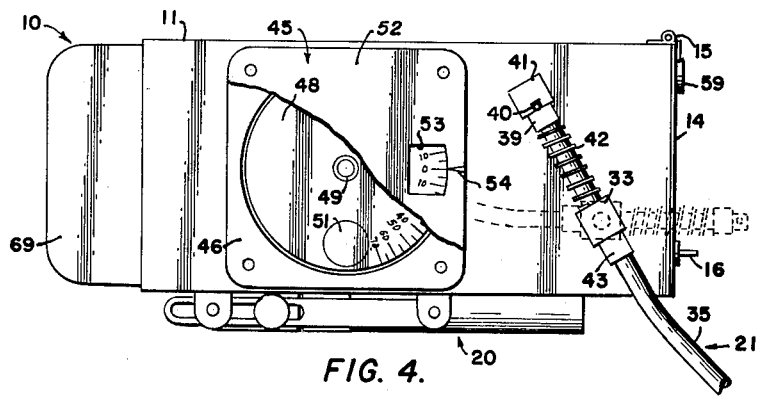
FIG. 4.
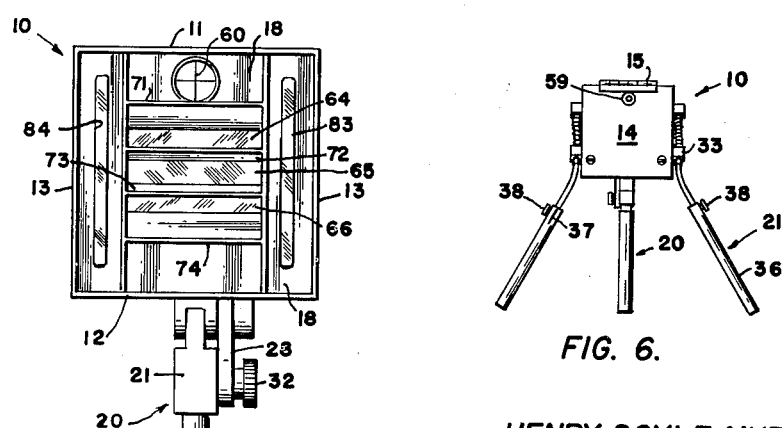
FIG. 5.
FIG. 6.
HENRY DOYLE MURRAY, JR.
EVERETT E. JOHNSTON
INVENTORS
BY *Herbert J. Brown*
ATTORNEY

United States Patent Office 3,138,779
Patented June 23, 1964

3,138,779
GLIDE SLOPE INDICATOR
Henry Doyle Murray, Jr., and Everett E. Johnston, Fort Worth, Tex., assignors to Standard Parts and Equipment Corporation, Fort Worth, Tex., a corporation of Texas
Filed July 25, 1962, Ser. No. 212,322
6 Claims. (Cl. 340—26)

This invention relates to illuminating devices and has reference to a glide slope indicator for directing aircraft to a landing strip at night.

An object of the invention is to provide a portable, self contained glide slope indicator including a low center of gravity ballast for maintaining the device in its set position.

A particular object of the invention is to provide an effective glide slope indicator with a single low candle power light source.

Another object is to provide a glide slope indicator including means for assuring clearance of obstacles when landing aircraft at night.

A further object is to provide an automatic angle indicator which shows the set angle of approach for the landing aircraft.

A further object of the invention is to provide means whereby the pilot of the aircraft will know when he is within the proximity of the glide slope.

These and other objects will become apparent from the following description and the accompanying drawings, wherein:

FIGURE 3 is a horizontal sectional view, looking down, taken approximately along the axis of the condensing lens.

FIGURE 4 is a side elevational view shown partly in fragmentary lines and particularly illustrating the automatic angle indicator.

FIGURE 5 is a front elevational view, and

FIGURE 6 is a reduced scale rear elevational view.

Figure 2:
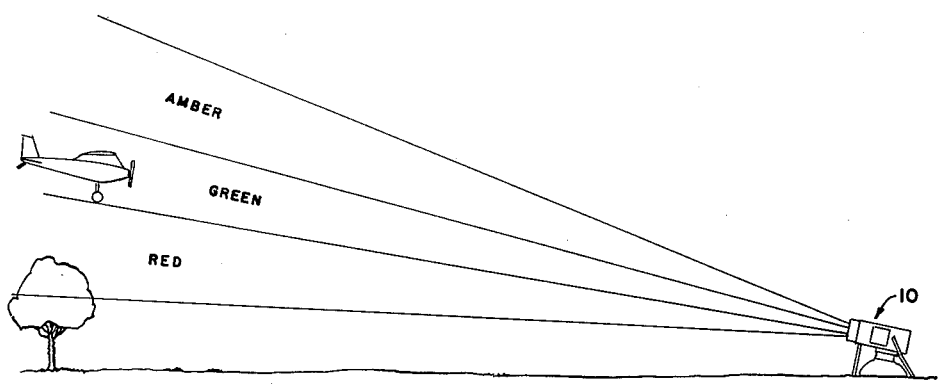
FIGURE 2 is a schematic view showing an airplane making a landing approach relative to the present glide slope indicator.

The glide slope indicator shown in drawings includes a rectangular housing 10 having a top 11, bottom 12, and sides 13. The rear wall 14 of the housing 10 is pivotally mounted on the rear edge of the top 11 by a hinge 15 to provide an access door. Rotatable fasteners 16, such as those sometimes used on the cowls of airplanes, are mounted in the lower side areas of the door 15 and engage U-shaped springs 17 mounted on the inner surfaces of the sides 13. There is a front wall 18 inwardly of the open front end of the housing 10, and an intermediate transverse wall 19 is located parallel with and between the front wall 18 and the access door 15.

The housing 10 is supported on three telescoping legs, the front leg of which is generally indicated by the reference numeral 20 and the two rear legs by the reference numeral 21. The front leg 20 is comprised of an upper portion 21 which is square in cross section, a depending cylindrical extension 22 and a tubular lower portion 23 which receives the cylindrical extension. The upper end of the lower leg portion is slotted, as at 24, where it is provided with a thumb screw 25 for adjusting the length of the leg 20. The upper end of the upper leg portion 21 is pivotally connected, by a pin 26, with depending ears 27 on the lower front center of the housing bottom 12. The front leg 20 is pivotally adjustable in a vertical plane by means of a bracket 28 having a longitudinal slot 29 in one end and a pin 30 in its remaining end. The pin 30 extends not only through the bracket 28, but also through a pair of ears 31 depending from the housing bottom 12 near the center thereof. A thumb screw 32 through the bracket slot 29 engages the bracket 28 with the upper leg portion 21.

The two rear legs 21 are mounted on opposite sides 13 of the housing 10 near the rear thereof. Each leg 21 includes a mounting block 33 which is pivotally mounted on a housing side 13 by means of a pin 34, and it is to be noted that the head of the pin is inside of the housing 10 so as to accommodate a bore, not numbered, through the block for slidably receiving a round leg member 35. The extending end of each leg member 35 is bent at approximately 30° outwardly of its mounting block 33 where it is slidably received in a tubular leg member 35. Like the first described leg 20, the upper end of the last referred to leg member 36 is split, as at 37, at its upper end and is provided with a thumb screw 38. Near the end of the round leg member 35 opposite the tubular member 36 there is a collar 39, and outwardly of the collar there is a laterally projecting pin 40 for engagement in a notch, not numbered, in a socket member 41 fixedly secured on the outer surface of the housing wall 13. As particularly shown in FIGURE 4, the angular relation of the socket member 41 to the pivoted mounting 33 is such that the rear legs 21 extend downwardly and rearwardly when the shouldered end of the round leg member 35 is engaged in the socket member 41. Between the mounting 33 and the shoulder 39, and around the leg member 35, there is a coiled compression spring 42 for holding the laterally projecting pin 41 in the notch in the socket member 41, but in order to limit the action of the spring there is another collar 43 on the leg member 35 adjacent the mounting block and on the side thereof opposite said spring. Thus, by reason of the described spring and collar arrangement, each leg 21 may be disengaged from its socket member 41, rotated, and positioned against a side 13 of the housing 10 as shown by dotted lines in FIGURE 4.

Figure 1:
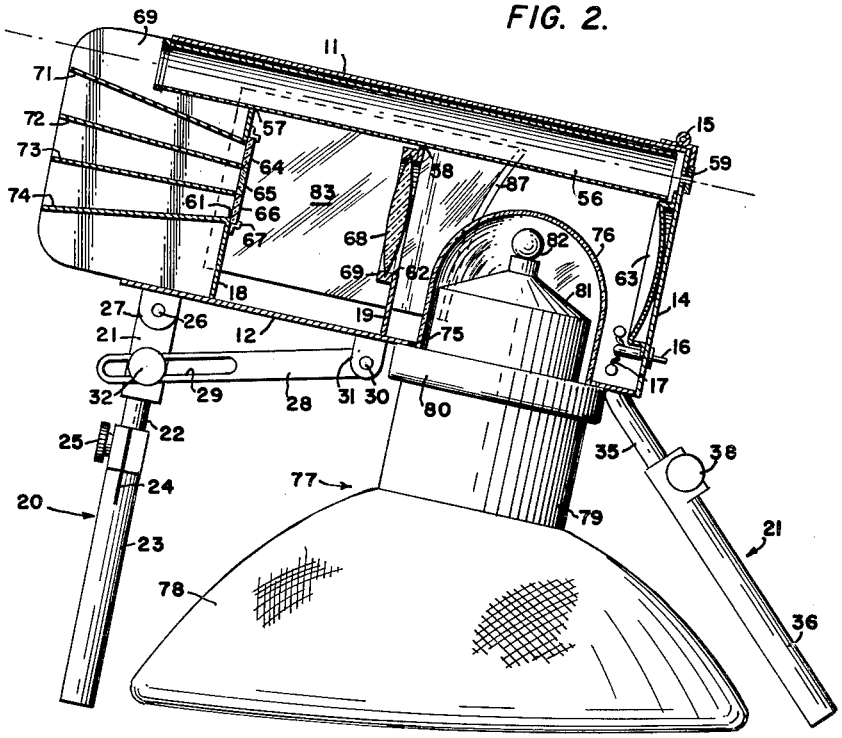
FIGURE 1 is a side elevation and partly sectional view of a glide slope indicator in accordance with the invention.

A leveling assembly 45 on one side of the housing 10 is shown in FIGURE 4 and is comprised of a square flat frame 46, a circular opening 47 therethrough, a transparent or translucent disk protractor 48 of a diameter less than the diameter of the opening in the frame, a pivotal mounting 49 for the protractor, a weight 51 embedded in the portractor near its periphery, and a square cover plate 52. The cover plate 52 and frame 46 are secured to the side 13 of the housing 10 by screws, not shown, and the pivotal mounting 49 is a pin which is mounted in the cover plate and extends inwardly thereof. There is a window 53 in the cover plate 52 and a pointer 54 thereon to register with "0" of the protractor 48 when the housing 10 is level. In the adjacent housing wall 13 there is an aperture 55 opposite the cover plate window 53, and it will be noted in FIGURE 1 that the aperture is adjacent the intermediate transverse wall 19 and on the side thereof toward the door 15. As will become apparent, the aperture 55 has to do with illuminating that portion of the protractor 48 opposite the window 53.

A sighting tube 56 is longitudinally mounted in and parallel with the upper center of the housing 10, which tube is secured in openings 57 and 58 in the front and intermediate walls 18 and 19. An apertured eye piece 59 is mounted in the door 15 in alignment with the axis of the tube 56, and the forward end of the tube is provided with crossed hairs 60.

The center of the front wall 18 has a rectangular opening 61, the intermediate wall 19 has a circular opening 62, and there is a circular concave metal reflector 63 mounted on the center inner surface of the door 15. Horizontal color filters 64, 65 and 66 of different colors of glass are positioned one above the other over the rectangular opening 61 and are secured in place by a rectangular frame 67 on the inner surface of the front wall 18. The center filter 65 is green, the upper filter 64 is amber and the lower filter is red. A condensing lens 68 is mounted in the opening 62 by a frame 69 secured to the intermediate wall 19. In the described arrangement, the axes of the lens 68 and the mirror 63 are in alignment with the center filter 65.

On each side of the rectangular opening 61 there is a vertical baffle 69 which extends from the top 11 to the bottom 12 of the housing 10 and outwardly through the housing's open end. The vertical baffles 69 are inwardly spaced from the housing walls 13 and provide hooded recesses 70 (FIGURE 3) for proximity lights to be described.

Outwardly diverging but generally horizontal baffles, numbered 71, 72, 73 and 74 from top to bottom, are secured between opposing surfaces of the vertical baffles 69 with their inner edges in contact with the horizontal edges of the filters 64, 65 and 66.

In the bottom 12 of the housing 10 between the intermediate wall 19 and the door 15 there is a circular opening 75 to receive the transparent dome 76 of a self contained lighting unit 77. In addition to the dome 76, the lighting unit 77 is comprised of a flexible bag like base 78 containing a ballast of sand, gravel, snow, ice or other available loose medium, a vertical tubular body 79 in the top of the base, a shoulder 80 around the top of the body, a battery case 81 received in the body, and a single filament low candle power lamp 82 in the upper end of the case, the filament of which lamp lies with the axis defined by the lens 68 and the reflector 63. The bottom 12 of the housing 10 rests on the shoulder 80 of the lighting unit 77 to maintain the lamp 82 in its described position or suitable clamp means, not shown, may be used for that purpose. Proximity lights, which appear as vertical bars of light in the recesses 70 in the forward end of the housing 10, are comprised of relatively thick sheets of light transmitting acrylic plastic 83 which are straight along their forward portions where they are received in vertical slots 84 and 85 in the forward and intermediate walls 18 and 19 and are curved inwardly at 86 toward the lamp 82 and have their inner edges 87 arced to fit the curvature of the light unit dome 76. The forward ends of the plastic sheets 83 are rough so as to diffuse the transmitted light and make the same readily visible.

In operation, the described glide slope indicator is set up at the end of the landing strip and is adjusted to the desired angle, as indicated by the automatic level assembly 45, by lengthening or shortening the legs 20 and 21. The sighting tube 56 is employed to determine the desired angle of the slope so that the pilot will avoid obstacles in his path. The pilot flies toward the open end of the housing and if he is above the angle defined by the axis of the lens 68 and the mirror 63 he will see an amber light as projected between the uppermost and adjacent baffles 71 and 72. If his approach is such that he sees only a green light, which is visible between baffles 72 and 73, his glide angle is correct for landing on the strip in the dark; on the other hand, if the light appears red, that is, light visible between baffles 73 and 74, he is too low and corrects accordingly. When he is within the proximity of the glide slope the proximity lights 83 appear and he can thus avoid striking the glide slope on the ground. It is pointed out that the ballast of the light unit tends to maintain the glide slope indicator in an erect position.

The invention is not limited to the exemplary construction herein shown and described, but may be varied within the scope of the appended claims.

What is claimed is:

1. A glide slope indicator comprising:
    a housing having forward and rear ends,
    multiple light filters of different colors within the forward end of said housing, said filters being positioned one above the other,
    a condensing lens mounted within said housing inwardly of said filters,
    outwardly diverging generally horizontal baffles arranged one above the other in the forward end of said housing and having their inner ends coinciding with the upper and lower edges of said filters, and
    a light source within said housing inwardly of both said filters and said lens.

2. A glide slope indicator as defined in claim 1, and wherein:
    said light source is comprised of a self contained unit and including:
    a flexible ballast bag extending beneath said housing.

3. A glide slope indicator as defined in claim 1, and including:
    proximity lights on the sides of said filters, said proximity lights being comprised of elongate light transmitting material extending to said light source, the locations of said proximity lights being such that they are visible within a given generally horizontal angle when within the proximity of said glide slope indicator.

4. A glide slope indicator as defined in claim 1, and including:
    sighting means carried by said housing, the axis of said sighting means being parallel with the axis of said lens.

5. A glide slope indicator as defined in claim 1, and wherein:
    said light source includes a single filament lamp, the filament of which lies within the axis of said lens.

6. A glide slope indicator as defined in claim 1, and including a leveling assembly comprising:
    a weighted transparent protractor,
    means pivotally mounting said protractor on one side of said housing,
    an aperture in said side of said housing opposite a portion of said protractor, and
    means directing light to said aperture.

References Cited in the file of this patent
UNITED STATES PATENTS
2,498,294   Pennow et al. _____ Feb. 21, 1950